Patented May 29, 1945

2,376,895

UNITED STATES PATENT OFFICE 2,376,895

LEAD PIGMENTS AND METHODS OF MAKING SAME

Louis E. Barton, Windsor, Conn.

No Drawing. Application February 3, 1943,
Serial No. 474,611

12 Claims. (Cl. 23—88)

In my copending application for patent Serial No. 428,035, filed January 24, 1942, I have disclosed a process of stabilizing lead silicate pigments against discoloration by light, and accelerating the reaction during formation of the pigment. The process consists in combining lead oxide and silica in the solid phase in the presence of a halogen to form an essentially pure lead silicate with a small amount of a chemically combined halogen. In the process referred to the halogen is limited to not more than 5%, for, though larger quantities are effective in stabilizing the product and accelerating the reaction they unnecessarily change the chemical composition of the pigment, reducing the percentage of lead silicate, the characteristic properties of which it is desired to retain.

I have now found that useful light-stable lead pigments can be made which contain larger amounts of the halogen elements with lead silicate than is permissible in the product of my earlier process referred to. The process of preparing my new lead pigments consists in making a mixture of such lead, silicon and halogen compounds as will, upon heating, supply to the product respectively only lead oxide, silica and the halogen, the halogen being more than 5% of the combined weights of lead oxide and silica, and the halogen compound used consisting of halogen combined with a component which is volatilized at the temperature of reaction and then heating the mixture until the ingredients chemically combine in the solid phase to form a white pigment.

The chemical reactions and combinations in the formation of my pigments are not definitely known and doubtless vary with different proportions of ingredients, but for purpose of description I shall refer to the products as lead silico-halides and express chemical compositions as proportions of normal lead halide and lead silicate. That the chemical constitution of my pigments is, in reality, more complex is indicated by some of their observed properties. For example, the normal lead halides are known to be appreciably soluble in water, but the lead silico-halides made by my process are insoluble in water, indicating the formation of some basic lead halide or other combination.

I can make by my process, lead silico-halides containing any desired proportion of lead halide and the balance lead silicate as will be hereinafter shown by examples. Of the halides, I have found the group comprising chlorine, fluorine and bromine particularly applicable in preparing my pigments since the normal halides, and apparently the basic halides, are white. Iodine cannot be used in proportions much more than 5% since normal lead iodide has a bright yellow color which prevents the preparation of a white product if larger quantities are used.

An important feature of my process from an industrial and economic standpoint is that the larger amounts of halogen compounds used so accelerate the formation of the pigment in the solid phase that the operation can be finished in a short time at comparatively low temperatures. The physical properties of my lead silico-halide pigments vary with composition and the inherent properties of the particular halide used but they retain in a considerable degree the durability characteristic of lead silicates when the pigments are mixed with suitable vehicles and the resulting paints exposed to the weather. The lead silico-halides have excellent white color and fair hiding power and are suitable for general application in oil, enamel and lacquer type paints and for other purposes where opaque white pigments are used, such as for rubber, linoleum and other floor coverings, printing inks, vitrified enamel et cetera.

In the operation of my process I can use either litharge (PbO) or other compounds of lead which upon heating supply to the product only PbO, such, for example, as red lead ($Pb_3O_4$), lead peroxide ($PbO_2$) and white lead $$(2PbCO_3 \cdot PbH_2O_2)$$

A pure grade of fine-grained silica is suitable. The silica may be either natural or artificially prepared and in either hydrous or anhydrous form. As the accelerating stabilizing reagent I can use either the free hydro acids of the halogen elements such as hydrochloric and hydrofluoric acids or other halogen compounds, such as ammonium halide salts, which by reaction during the process supply to the product only the halogen, and volatilize other components of the halogen compound used.

I first thoroughly mix and mill the materials in the required proportions thereby reducing particle size and assuring a close association of ingredients. A porcelain or silex mill lining is satisfactory to avoid contamination of materials. In case a solid accelerator, such as an ammonium halide salt, is used, the charge may be dry-milled but preferably I first wet-mill the silica and lead compounds together and then add the halogen compound as a solution and continue milling until the halogen is completely fixed as shown by absence of any halogen in the solution. If the halogen compound is a solution of an ammonium salt, ammonia is liberated. The slurry discharged from the mill may be partially dewatered and dried if desired.

Either the wet pulp or the dry mixture is then charged into the heating furnace. A furnace lining of high-grade fire brick is satisfactory to avoid contamination of materials. Means should be provided for control of temperature. In furnaces where products of combustion contact the charge a neutral or oxidizing flame should be maintained to avoid possible reduction of metallic oxides.

If the mixture of lead, silicon and halogen compounds has been prepared by dry-milling or blending, the reaction between the halogen and lead compounds takes place when the mixture is heated, and in case the halogen compound is an ammonium salt ammonia is evolved. The reaction between the halogen compound and lead oxide takes place at low temperatures and is rapid and complete before the charge has reached a temperature at which lead oxide and silica combine.

Lead oxide and silica alone react very slowly at a temperature of 500° C. but at 550° C. a white lead silicate can be made by heating for a period of about 48 hours. While such temperatures are obviously impractical for making lead silicates from mixtures of lead compounds and silica only, even lower temperature can be used if an accelerating and stabilizing compound of the class before referred to is used. My lead silico-halide pigments can be made in the temperature range 350 to 650° C. Preferred temperature ranges for the different types of lead silico-halides with variations in amount and kind of halide compound will be shown later by examples.

The time required in the calcinizing zone of the furnace depends upon the temperature and composition of the charge: the higher the temperature within the permissible range the shorter the time. The time required to complete the reaction may vary from 10 minutes to several hours but it is usually desirable to hold the charge at the proper temperature a little longer than appears absolutely necessary to insure that the reaction is complete. The progress of the reaction during calcination may be judged by withdrawing a sample from the furnace for inspection. The finished product should be substantially white and should not acquire a yellower or darker color upon milling or grinding the sample in a mortar.

Lead silico-halide pigments, if not calcined at too high a temperature, are soft in texture and fine enough to be used as pigments for paint, but if desired the calcined pigment may be milled. Either dry or wet-milling methods may be used.

The following examples show the working of my process and indicate the nature and composition of a few of the many possible lead silico-halide pigments. The products in all cases were found to be stable white pigments when tested by exposure to sunlight.

*Example 1.—Lead silico chloride*

To a mixture of 55 parts of lead oxide (PbO) and 45 parts of silica enough water was added to form a thick slurry and the mixture milled for 1¼ hours. 10 parts of ammonium chloride in 100 parts of water were then added to the mill charge, the milling continued for ¼ hour longer and the mixture dewatered and dried. The dry material was then calcined for 6 hours in the temperature range 420 to 450° C. The composition of the resulting white pigment was:

Lead oxide (PbO) ------- 33.58% } Lead silicate
Silica ------------------ 42.67% }
Lead chloride ---------- 23.75%

The pigment had a tinting strength of 140 compared with that of standard basic carbonate white lead taken as 100.

*Example 2.—Lead silico-chloride*

A mixture of 79.6 parts of lead oxide (PbO), 10.6 parts of silica and 19.5 parts of ammonium chloride was made into a thick slurry with water, milled for ½ hour and then dewatered and dried. The mixture was then calcined for 3 hours in the temperature range 460 to 480° C. The composition of the resulting white pigment was:

Lead oxide (PbO) -- 39.40% } Normal lead silicate
Silica ------------- 10.60% }
Lead chloride ------ 50.00%

The pigment had a tinting strength of 140 compared with that of standard basic carbonate white lead taken as 100.

*Example 3.—Lead silico-chloride*

A mixture of 79.8 parts of lead oxide (PbO) and 5.35 parts of silica was made into a thick slurry with water and milled for ½ hour. 53.72 parts of commercial hydrochloric acid, equivalent to 19.33 parts of actual HCl, diluted with 100 parts of water was then added and the milling continued for ¼ hour longer. The mixture was dewatered and dried and then calcined for ½ hour in the temperature range 530 to 550° C. The composition of the resulting white pigment was:

Lead oxide (PbO) -- 19.65% } Normal lead silicate
Silica ------------- 5.35% }
Lead chloride ------ 75.00%

The pigment had a tinting strength of 135 compared with that of standard basic carbonate white lead taken as 100.

*Example 4.—Lead silico-fluoride*

A mixture of 81.7 parts of lead oxide (PbO), 16.05 parts of silica and 7.55 parts of ammonium fluoride was made into a thick slurry with water, milled for ½ hour and then dewatered and dried. The mixture was then calcined for 1 hour in the temperature range 500 to 530° C. The composition of the resulting white pigment was:

Lead oxide (PbO) -- 58.95% } Normal lead silicate
Silica ------------- 16.05% }
Lead fluoride ------ 25.00%

The pigment had a tinting strength of 75 compared with that of standard basic carbonate white lead taken as 100.

*Example 5.—Lead silico-fluoride*

A mixture of 84.7 parts of lead oxide (PbO), 10.7 parts of silica and 15.1 parts of ammonium fluoride was made into a thick slurry with water; milled for ½ hour and then dewatered and dried. The mixture was then calcined for ¼ hour in the temperature range 390 to 410° C. The composition of the resulting white pigment was:

Lead oxide (PbO) -- 39.30% } Normal lead silicate
Silica ------------- 10.70% }
Lead fluoride ------ 50.00%

The pigment had a tinting strength of 65 compared with that of standard basic carbonate white lead taken as 100.

Example 6.—Lead silico-bromide

A mixture of 74.2 parts of lead oxide (PbO), 16 parts of silica and 13.3 parts of ammonium bromide was made into a thick slurry with water; milled ½ hour and then dewatered and dried. The mixture was then calcined for 2 hours in the temperature range 550 to 570° C. The composition of the resulting white pigment was:

Lead oxide (PbO) -- 59.00% } Normal lead silicate
Silica ----------- 16.00%
Lead bromide ----- 25.00%

The pigment had a tinting strength of 110 compared with that of standard basic carbonate white lead taken as 100.

Example 7.—Lead silico-bromide

A mixture of 69.7 parts of lead oxide (PbO), 10.6 parts of silica and 26.7 parts of ammonium bromide was made into a thick slurry with water; milled for ½ hour and then dewatered and dried. The mixture was then calcined for ¼ hour at 380 to 400° C. The composition of the resulting white pigment was:

Lead oxide (PbO) -- 39.35% } Normal lead silicate
Silica ----------- 10.65%
Lead bromide ----- 50.00%

The pigment had a tinting strength of 210 compared with that of standard basic carbonate white lead taken as 100.

I claim as my invention:

1. An opaque white pigment consisting of lead oxide, silica and lead halide in chemical combination, the halide being selected from the group consisting of the chloride, fluoride and bromide of lead and the halogen being in amount more than 5% of the total weight of lead calculated as PbO and silica.

2. An opaque white pigment consisting of lead oxide, silica and lead chloride in chemical combination, the chlorine being in amount more than 5% of the total weight of lead calculated as PbO and silica.

3. An opaque white pigment consisting of lead oxide, silica and lead fluoride in chemical combination, the fluorine being in amount more than 5% of the total weight of lead calculated as PbO and silica.

4. An opaque white pigment consisting of lead oxide, silica and lead bromide in chemical combination, the bromine being in amount more than 5% of the total weight of lead calculated as PbO and silica.

5. The method of making an opaque, white, lead silico-halide pigment which consists in intimately mixing lead and silicon compounds and a halogen compound selected from the group consisting of chlorides, fluorides and bromides, which upon heating will supply respectively only lead oxide (PbO), silica and a halogen, the halogen being in amount more than 5% of the total weight of lead calculated as PbO and silica, and the halogen compound used consisting of halogen combined with a component which is volatilized at the temperature of reaction, and then heating the mixture at a temperature sufficiently high to chemically combine the ingredients in the solid phase without fusion to form said pigment.

6. The method of making an opaque, white, lead silico-halide pigment which consists in intimately mixing lead oxide (PbO), silica and a halogen compound selected from the group consisting of chlorides, fluorides and bromides, which upon heating will supply only the halogen, the halogen being in amount more than 5% of the total weight of lead calculated as PbO and silica, and the halogen compound used consisting of halogen combined with a component which is volatilized at the temperature of reaction, and then heating the mixture in the temperature range 350 to 650° C. to chemically combine the ingredients in the solid phase without fusion to form said pigment.

7. The method of making an opaque, white, lead silico-chloride pigment which consists in intimately mixing lead and silicon compounds and a chlorine compound which upon heating will supply respectively only lead oxide (PbO), silica and chlorine, the chlorine being in amount more than 5% of the total weight of lead calculated as PbO and silica, and the chlorine compound used consisting of chlorine combined with a component which is volatilized at the temperature of reaction, and then heating the mixture at a temperature sufficiently high to chemically combine the ingredients in the solid phase without fusion to form said pigment.

8. The method of making an opaque, white, lead silico-chloride pigment which consists in intimately mixing lead oxide (PbO), silica and a chlorine compound which upon heating will supply only chlorine, the chlorine being in amount more than 5% of the total weight of lead calculated as PbO and silica, and the chlorine compound used consisting of chlorine combined with a component which is volatilized at the temperature of reaction, and then heating the mixture in the temperature range 350 to 550° C. to chemically combine the ingredients in the solid phase without fusion to form said pigment.

9. The method of making an opaque, white, lead silico-fluoride pigment which consists in intimately mixing lead and silicon compounds and a fluorine compound which upon heating will supply respectively only lead oxide (PbO), silica and fluorine, the fluorine being in amount more than 5% of the total weight of lead calculated as PbO and silica, and the fluorine compound used consisting of fluorine combined with a component which is volatilized at the temperature of reaction, and then heating the mixture at a temperature sufficiently high to chemically combine the ingredients in the solid phase without fusion to form said pigment.

10. The method of making an opaque, white, lead silico-fluoride pigment which consists in intimately mixing lead oxide (PbO), silica and a fluorine compound which upon heating will supply only fluorine, the fluorine being in amount more than 5% of the total weight of lead calculated as PbO and silica, and the fluorine compound used consisting of fluorine combined with a component which is volatilized at the temperature of reaction, and then heating the mixture in the temperature range 350 to 550° C. to chemically combine the ingredients in the solid phase without fusion to form said pigment.

11. The method of making an opaque, white, lead silico-bromide pigment which consists in intimately mixing lead and silicon compounds and a bromine compound which upon heating will supply respectively only lead oxide (PbO), silica and bromine, the bromine being in amount more than 5% of the total weight of lead calculated as PbO and silica, and the bromine compound used consisting of bromine combined with a component which is volatilized at the temperature of reaction, and then heating the mixture at a temperature sufficiently high to chemically combine the ingredients in the solid phase without fusion to form said pigment.

12. The method of making an opaque, white, lead silico-bromide pigment which consists in intimately mixing lead oxide (PbO), silica and a bromine compound which upon heating will supply only bromine, the bromine being in amount more than 5% of the total weight of lead calculated as PbO and silica, and the bromine compound used consisting of bromine combined with a component which is volatilized at the temperature of reaction, and then heating the mixture in the temperature range 350 to 550° C. to chemically combine the ingredients in the solid phase without fusion to form said pigment.

LOUIS E. BARTON.